(12) United States Patent
Campbell et al.

(10) Patent No.: US 7,863,039 B2
(45) Date of Patent: Jan. 4, 2011

(54) ORGANIC WASTE TREATMENT APPARATUS

(75) Inventors: Angus Campbell, Connells Point (AU); Mark Jackson, Banksia (AU)

(73) Assignee: Biosys Pty Ltd., South Wales (AU)

( * ) Notice: Subject to any disclaimer, the term of this patent is extended or adjusted under 35 U.S.C. 154(b) by 834 days.

(21) Appl. No.: 10/529,855

(22) PCT Filed: Sep. 24, 2003

(86) PCT No.: PCT/AU03/01249

§ 371 (c)(1),
(2), (4) Date: Mar. 25, 2005

(87) PCT Pub. No.: WO2004/029001

PCT Pub. Date: Apr. 8, 2004

(65) Prior Publication Data

US 2005/0260744 A1    Nov. 24, 2005

(30) Foreign Application Priority Data

Sep. 27, 2002    (AU) .............................. 2002951743

(51) Int. Cl.
*C12M 1/00* (2006.01)
(52) U.S. Cl. ................. 435/290.2; 435/290.4
(58) Field of Classification Search ............. 435/290.2, 435/290.4, 290.1, 290.3; 366/209, 324.4, 366/325.5, 325.8, 327.1, 329.1
See application file for complete search history.

(56) References Cited

U.S. PATENT DOCUMENTS

| | | | | |
|---|---|---|---|---|
| 3,554,454 | A | * | 1/1971 | Gruendler .................... 241/73 |
| 5,234,596 | A | * | 8/1993 | Greeb ......................... 210/614 |
| 5,258,306 | A | * | 11/1993 | Goldfarb ................. 435/290.2 |
| 5,534,042 | A | * | 7/1996 | Tsuchida .......................... 71/9 |
| 6,139,793 | A | * | 10/2000 | Vanderwal ..................... 422/1 |

(Continued)

FOREIGN PATENT DOCUMENTS

DE    41 37 909    5/1993

(Continued)

OTHER PUBLICATIONS

Machine translation of FR 2 597 764 A1 (translated on Sep. 23, 2009).*

*Primary Examiner*—William H Beisner
*Assistant Examiner*—Michael Hobbs
(74) *Attorney, Agent, or Firm*—Bose McKinney & Evans LLP

(57) ABSTRACT

A composting system including a vertically-orientated vessel with mechanisms attached to a vertically oriented central mounted rotating shaft, including rotatable size reduction blade(s), agitation mechanism(s), and discharge blade/mechanism(s). The composting system includes internal size reduction mechanism for reducing the size of material introduced to the vessel. The composting system includes a loading hatch, a discharge hatch, and a source of air to maintain aerobic conditions within the vessel. In use, material introduced moves from the upper region of the vessel gravitationally and via agitation through a zone of size reduction to the lower region of the vessel. Process conditions within the vessel are controlled by an operator and via electronic control mechanism, which can monitor operating conditions such as temperature and loading rate (for example), to manage air injection, mechanical agitation and size reduction such that composting proceeds efficiently and at an optimal rate.

40 Claims, 4 Drawing Sheets

U.S. PATENT DOCUMENTS

Figure 1:
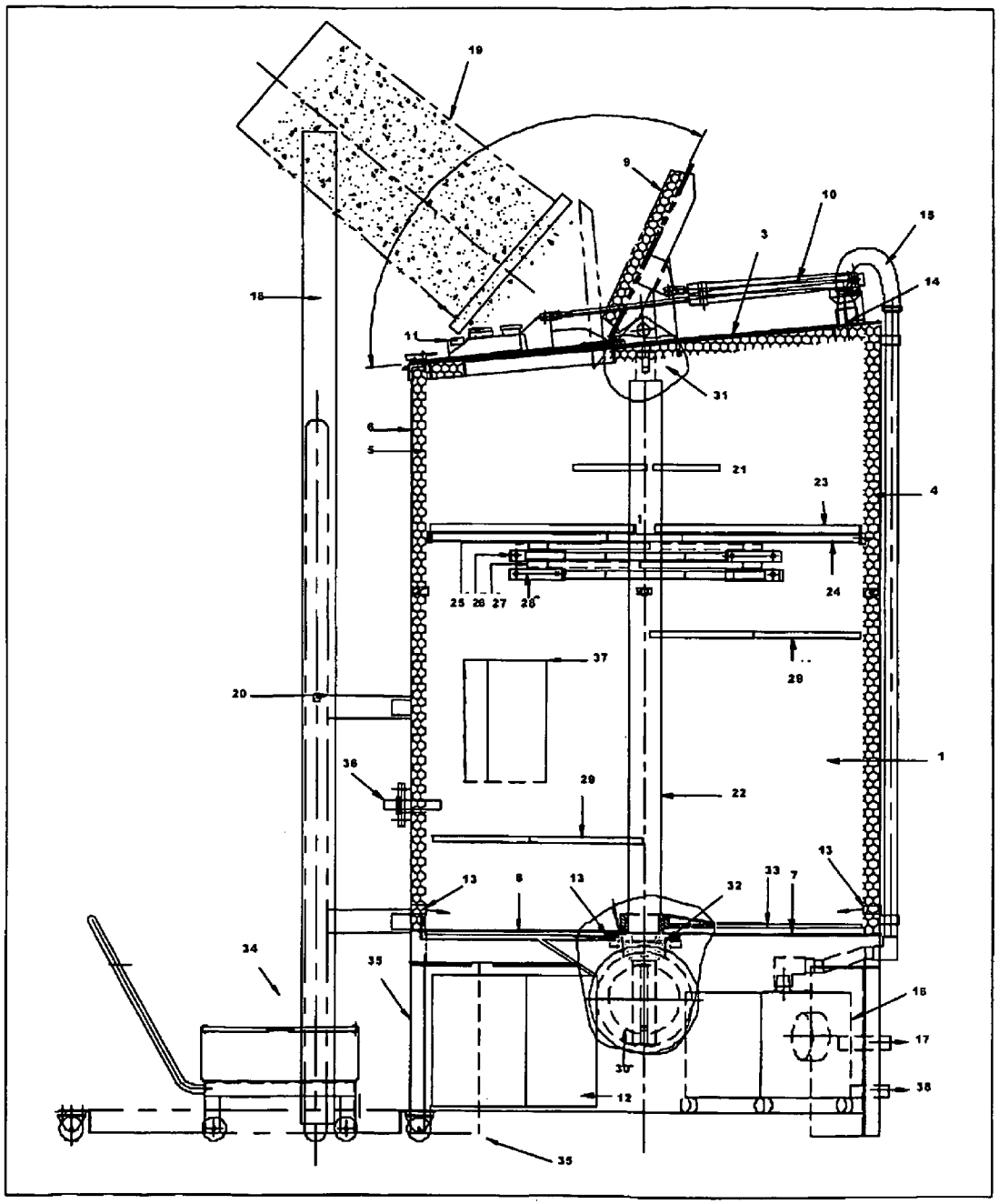

| | | |
|---|---|---|
| 6,702,210 B1 * | 3/2004 | Ueda .......................... 241/36 |
| 2002/0090718 A1 * | 7/2002 | Chen et al. ............... 435/290.3 |
| 2002/0096459 A1 * | 7/2002 | Suzuki et al. ............... 210/137 |

FOREIGN PATENT DOCUMENTS

| | | |
|---|---|---|
| EP | 0 676 385 | 10/1999 |
| FR | 2 597 764 A1 * | 4/1986 |
| JP | 11-199356 | 12/1997 |
| JP | 2001002483 | 1/2001 |
| WO | WO99/03799 | 1/1999 |
| WO | WO00/02832 | 1/2000 |

* cited by examiner

ORGANIC WASTE TREATMENT APPARATUS

FIELD OF THE INVENTION

The present invention relates to the field of waste treatment, particularly food waste treatment. The present invention provides a novel waste treatment apparatus which may be used, for example, as an on-site waste treatment vessel at businesses where significant amounts of food waste are produced (e.g., accommodation enterprises, fruit and vegetable shops and markets, retirement villages and multi-unit dwellings, supermarkets, restaurants/cafes/cafeterias, government workplaces, and hospitals).

BACKGROUND TO THE INVENTION

Any discussion of the prior art throughout the specification should in no way be considered as an admission that such prior art is widely known or forms part of common general knowledge in the field.

Food waste and other putrescible organic waste is a major contributor to the cost of waste disposal. This is due largely to the present need to transport such wastes to specific landfill sites which are often at significant distances from the sites of the waste production. In addition, the disposal of wastes such as food waste and other putrescible organic waste is particularly undesirable due to their high water and nutrient content, leading to the release of organic acids and other compounds during anaerobic decomposition which are major contributors to the negative environmental impacts associated with landfills (Recycled Organics Unit, 2001a, Greenhouse gas emissions from composting facilities, Report for Central Coast Waste Board, NSW, September 2001). Indeed, food waste is the second largest source of methane in landfills (behind paper and cardboard) (US EPA, 1998, Greenhouse gas emissions from management of selected materials in municipal solid waste, United States Environmental Protection Agency.). The nutrients present in food waste also contribute to the high nutrient and heavy metal loadings in landfill leachate, and is a major contributor to groundwater and surface water contamination in regions with unlined landfills (Russel and Higer, 1988, Assessment of groundwater contamination near Lantana landfill, southeast Florida, Ground Water, 26(2): 156-164; Borden and Yunoschak, 1990, Ground and surface water quality impacts of North Carolina sanitary landfills. Water Resources Bulletin, 26(2): 269-277; Assmuth and Strandberg, 1993, Groundwater contamination at Finnish landfills, Water, Air and Soil Pollution, 69 (1/2):179-199).

In addition to the environmental concerns regarding the landfill disposal of putrescible food and organic wastes, in many countries including Australia, the available landfills are reaching capacity. For example, in Sydney, present landfill capacity for putrescible food and organic wastes in the Greater Sydney Region is expected to be exhausted by 2011, based upon current levels of waste generation and recycling rates (Wright, 2000, Independent Public Assessment—Landfill Capacity and Demand, Report prepared for the Minister of Urban Affairs and Planning, State Government of NSW, September 2000). Such shortages of landfill sites, and the resistance of communities to the establishment of new landfill sites on health, environmental and monetary concerns, is urgently impelling the need to divert recyclable wastes from landfill. Indeed, many Governments have now developed policies to reduce landfill disposal of putrescible food and organic wastes (e.g., the NSW Government policies, 'Waste Not' Development Control Plan (DCP) and Waste Reduction and Procurement Policy). However, the meaningful implementation of these policies mandates the identification and development of practical alternatives to landfill disposal.

The present invention is directed at the provision of a simple and cost effective waste treatment apparatus, which may be readily used by waste producers, to decompose food and other putrescible organic wastes to a useful composted waste material product and thereby divert such wastes from landfill disposal. The composted waste material product can be used to improve soils, plants and the environment in which we live.

There are four main types of composting systems that have been devised for commercial purposes, however, hybrid systems are also available. The four main systems can be categorized as follows:

A windrow system: this is an open system and the material to be composted is piled in long rows. These are aerated by forced convection or by frequent turning using a mechanical agitator system.

An enclosed static stack system: air is forced up through the pile of the material to be composted, which is enclosed is some type of vessel. This is a batch process in which the vessel is loaded and unloaded once for each composting cycle.

An agitated bay system: these systems primarily utilize U-shaped channels or bays. Material to be composted is often added semi-continuously and periodically agitated and moved by mechanical means. However, primary aeration is often achieved via forced air movement.

Continuous or semi-continuous in-vessel composting systems: in these systems the material to be composted is fed in one end (side, top or bottom) of the composting systems and exits continuously from the other.

Numerous examples of the above systems are currently being produced and are illustrated in "The Practical Handbook of Compost Engineering", Roger T Haug, Lewis Publishers, 1993 (ISBN 0-87371-373-7).

It is an object of the present invention to overcome or ameliorate at least one of the disadvantages of the prior art, or to provide a useful alternative.

An object of the present invention, at least in a preferred embodiment, is to provide an in-vessel, semi-continuous and generally vertical composting system, which provides an efficient alternative to existing composting systems.

SUMMARY OF THE INVENTION

Thus, in a first aspect, the present invention provides an apparatus for aerobically composting waste material, the apparatus comprising:

an enclosed vessel comprising a top wall, base wall and side wall(s) defining an interior vessel space;

a rotatable shaft located within said vessel space;

a drive means operatively connected to said rotatable shaft for driving said shaft;

size reduction means mounted on said rotatable shaft for reducing the size of waste material introduced to the vessel, wherein said size reduction means divides the interior vessel space into first and second regions and defines a zone of size reduction through which all waste material must pass as it passes through the vessel;

a loading port through which waste material may be introduced to said first region of the vessel;

a discharge port through which waste material may be removed from the second region of the vessel; and a source of oxygen to maintain aerobic conditions within said vessel, wherein, when the apparatus is in use, waste material introduced to said vessel moves from said region through the size reduction means to said second region.

The vertically-orientated vessel may be constructed of any suitable material, but is preferably constructed of stainless steel or like corrosion-resistant material. The walls, and particularly the side wall(s), are preferably insulated so as to retain heat generated by aerobic composting of introduced waste material. The volume of the internal vessel space is preferably within the range of 1.5 to 5.0 m$^3$, more preferably, 2.0 to 3.0 m$^3$. In a particularly preferred embodiment, the volume of the internal vessel space is about 2.5 m$^3$. This volume is sufficient to enable an apparatus according to the present invention to compost about 1230 kg of food waste material per week.

The size reduction means is provided so as to reduce the size of introduced waste material to particles/pieces of an average diameter/dimension size of approximately 2 to 10 mm. It has been found that by reducing the size of introduced waste material to particles/pieces greatly increases the rate of composting which may be achieved and assists in the production of a well mixed and uniform, composted product. The size reduction means also assists in the thorough mixing of the introduced waste material. The apparatus is preferably arranged so that all waste material must pass through the size reduction means when passing from the upper region to the lower region of the vessel.

The size reduction means preferably comprises a plurality of bars, blades or cutting plates. The bars, blades or cutting plates do not need to be sharp as the size reduction may be achieved through mechanical shearing and tearing. The bars, blades or cutting plates may therefore take the simple form of flat bars, preferably with beveled edges and/or sharp edges. Preferably, at least one of the bars, blades or cutting plates is adapted for movement (e.g., by horizontal rotation). More preferably, the size reduction means comprises two or more, horizontally rotatable bars, blades or cutting plates, and two or more fixed (e.g., mounted to the side wall(s)), horizontally disposed and parallel bars, blades or cutting plates, wherein at least one of the horizontally rotatable bars, blades or cutting plates rotates within a parallel space between two of said fixed bars, blades or cutting plates. Preferably, the parallel space between said two of said fixed bars, blades or cutting plates is in the range of 10 to 200 mm in width, more preferably 100 to 150 mm in width. The width of the rotatable and fixed blades or cutting plates may be substantially alike and, preferably, is within the range of 50 to 100 mm. The bars, blades or cutting plates may be constructed of any suitable material, but are preferably constructed of stainless steel or like corrosion-resistant material.

The loading hatch may be located in the side wall(s) adjacent to the top wall, but more preferably, is located in the top wall. The loading hatch may be conveniently adapted for controlled or automated opening and closing. Preferably, the loading hatch, when closed, forms an air-tight seal to prevent escape of any odorous gas or "process air" from the vessel.

The discharge hatch may be located in the side wall(s) adjacent to the base wall, but more preferably, is located in the base wall. The discharge hatch may be conveniently adapted for controlled or automated opening and closing. Preferably, the dispatch hatch, when closed, forms an air-tight and liquid seal to prevent escape of any odorous gas or process air and liquids (i.e., leachates) from the vessel.

The apparatus is provided with a source of oxygen (e.g., a source of compressed air), to maintain aerobic conditions within the vessel. This is important in order to achieve composting by aerobic microorganisms rather than anaerobic microorganisms which tend to produce greater quantities of odorous gas. The supply of oxygen may be controlled or automated so as to provide sufficient oxygen to maintain the optimum temperature and oxygen conditions in the vessel for composting by aerobic mesophilic and thermophilic microorganisms (e.g., temperature of about 50-55° C.). Automated control of oxygen supply may be achieved by providing a temperature sensor within the vessel. When the temperature drops to below a first set temperature (e.g., 45° C.), as measured by the temperature sensor, the supply of oxygen is activated in a manner that causes an increase in temperature to approximately 50° C. Also, when the temperature increases to above a second set temperature (e.g., 60° C.), as measured by the temperature sensor, the supply of oxygen is activated to blow off excess heat until a temperature of approximately 55° C. is achieved. The temperature sensor is preferably located in the lower region of the vessel in a position within 250-450 mm of the base wall. Supplied oxygen enters the vessel by one or more inlets, which are preferably located in the side wall(s) adjacent to the join with the base wall and also in a central location in the base wall. The apparatus is provided with at least one outlet, preferably located in or adjacent to the top wall, to discharge odorous gas or process air from within the vessel. This process air may be discharged to the atmosphere via vent or via an odor scrubber to remove any odorous gases.

Movement of the bars, blades or plates is conveniently achieved by mounting the bars, blades or cutting plates on a rotatable shaft, having a vertical axis of rotation, which is preferably mounted on the base wall and, preferably, the top wall, such that the rotatable shaft rotates centrally within the vessel. The rotatable shaft may be constructed of any suitable material, but is preferably constructed of stainless steel or like corrosion-resistant material. The rotatable shaft may be driven by any suitable means (e.g., an electric motor), and may be adapted for continuous operation or, more preferably, controlled and/or automated, intermittent operation. The rotation of the rotatable shaft may be at a speed within the range of 5 to 60 rpm, but more preferably, within the range of 10 to 30 rpm.

Such a rotatable shaft may also be provided with fittings, other than the one or more blades or cutting plates. For example, on a portion of the rotatable shaft that resides within the upper region of the vessel, there may be provided one or more spreader or mixer bar(s) to assist in evenly distributing and mixing introduced waste material. Also, on a portion of the rotatable shaft that resides within the lower region of the vessel, there may be provided one or more mixing bar(s) to ensure that the waste material in the lower region of the vessel is moved by agitation therefore ensuring even and consistent flow of composting materials. Further, on a portion of the rotatable shaft adjacent to the base wall, there may be provided one or more sweeper bar(s) or plate(s) to sweep composted material adjacent to the base wall towards and out of the discharge hatch. The rotatable shaft preferably operates both in a clockwise and anti-clockwise direction, and all rotating bars and blades or cutting plates are preferably symmetric is plan view to allow for effective action in both directions.

In a second aspect, the present invention provides a method of producing a composted product using an apparatus for aerobically composting waste material, said apparatus comprising:

a vessel comprising a top wall, base wall and side wall(s) defining an interior vessel space;

a rotatable shaft located within said vessel space;

a drive means operatively connected to said rotatable shaft for driving said shaft;

size reduction means mounted on said rotatable shaft for reducing the size of waste material introduced to the vessel, wherein said size reduction means divides the interior vessel space into first and second regions and defines a zone of size reduction through which all waste material must pass as it passes through from input end to discharge end of the vessel;

a loading port through which waste material may be introduced to said first region of the vessel;

a discharge port through which waste material may be removed from said second region of the vessel; and a source of oxygen to maintain aerobic conditions within said vessel, wherein said method comprises introducing said waste material into said first region of the vessel through said loading port, passing said waste material through said size reduction means to reduce the size of the waste material, whilst maintaining conditions within said vessel suitable for aerobically composting said waste material.

Preferably, the waste material is introduced to the vessel with a suitable absorbent or adsorbent material (e.g., wood shavings or sawdust) to reduce any excess amounts of moisture or liquids in the waste material. The waste material may be, if desired, pre-mixed with the adsorbent or absorbent material prior to introduction into the vessel. Preferably, the adsorbent or absorbent material and waste material is introduced into the vessel in a ratio (on a weight to weight basis) of 1:8 to 1:2, more preferably, 1:4 to 1:5.

In a third aspect, the present invention provides a composted product produced in accordance with the method of the second aspect.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to."

BRIEF DESCRIPTION OF ACCOMPANYING FIGURES

One or more embodiments of the invention will now be described, by way of example only, with reference to the accompanying drawings in which:

FIG. 1 shows a longitudinal section view of an organic waste treatment apparatus according to the present invention.

Figure 2:
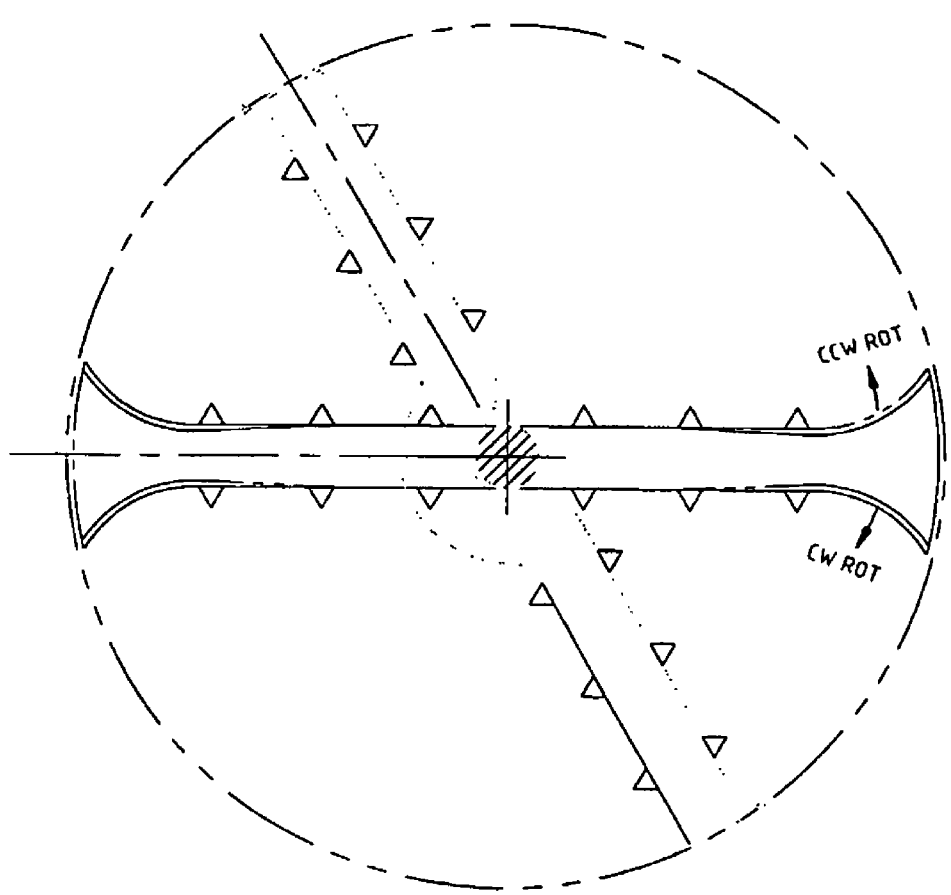

FIG. 2 provides a plan view of a particular embodiment of a size reduction means which may be employed in an organic waste treatment apparatus shown in FIG. 1. The embodiment comprises spiked, fixed and rotating size reduction blades.

Figure 3:
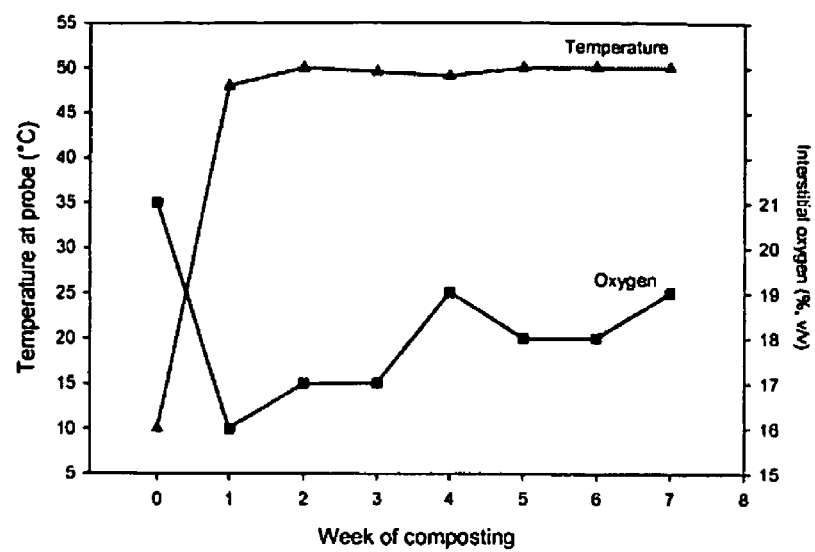

FIG. 3 provides graphical results of temperature and interstitial oxygen concentration changes during a seven week composting trial of the apparatus described in Example 1. In this trial, a temperature feedback mechanism provided in the apparatus was programmed to a set-point of 50° C.

FIGS. 4a, 4b and 4c provide graphical results of temperature and interstitial oxygen distribution at different depths in the composting chamber during a seven week composting trial of the apparatus described in Example 1. The results shown are typical of that generated over the duration of the trial. FIG. 4a: 300 mm from the top of the composting mass, FIG. 4b: middle of the chamber (900 mm above base), and FIG. 4c: bottom of chamber (300 mm above base).

DETAILED DISCLOSURE OF THE INVENTION

FIG. 1 shows a waste treatment apparatus or compostor according to the present invention. The apparatus comprises a generally cylindrical vessel or chamber (1) with insulated side walls (2) and top wall or ceiling (3) comprising a suitable insulation material (4) (expanded fiberglass baits) sandwiched between an inner vessel (5) generally constructed of stainless steel or like corrosion-resistant material and an outer shell (6). The chamber further comprises a base (7), also constructed of stainless steel or like corrosion-resistant material, including a discharge outlet or hatch (8). When closed, the discharge hatch forms an air and liquid tight seal. The ceiling (3) of the chamber (1) is provided with a loading hatch (9) which closes in an air-tight manner. The loading hatch may be operated manually, or automatically by a pneumatic cylinder (10) controlled via a simple switch (11). With the discharge and loading hatches (8, 9) closed, the chamber (1) is substantially sealed from the atmosphere.

The chamber (1) is provided with a source of compressed air (12) (e.g., an air compressor or cylinder of compressed air) which provides air, under positive pressure, through a number of inlets (13) located in the lower regions of the side walls and via the lower bearing housing in the base (7). In the ceiling (3), an outlet (14) is provided for escape or removal of process air and gases. The outlet (14) may be connected directly to atmosphere via a vent stack, or may be piped in communication (15) with a scrubber (16) for removal of odors from the process air and gases, and an air/gas discharge outlet (17) to the atmosphere. The scrubber may be in communication with a condensate discharge outlet (38).

The exterior of the chamber (1) may be equipped with an automated bin loading mechanism (18) (e.g., a garbage bin lifting mechanism) to introduce waste materials directly from a bin (19) into the chamber (1) through the loading hatch (9). The exterior of the chamber (1) may also be equipped with a ladder (20) to provide ready access by an operator.

In the interior of the chamber (1), at a position adjacent to the loading hatch, is provided one or more a spreader or mixer bar(s) (21) to assist in evenly distributing and mixing introduced waste materials across the area of the upper section of the chamber (1). The spreader bar(s) (21) are perpendicularly mounted upon a rotatable, centrally located, vertical shaft (22), so that the spreader bar(s) are slowly rotated (e.g., 10 to 30 rpm). Below the spreader bar(s) (21), are provided fixed and/or moving blades or cutting edges (23-28) which reduce the size of the waste material and achieve further mixing. In the embodiment shown in FIG. 1, these blades or cutting edges comprise: a pair of blades (23) perpendicularly mounted upon the rotatable shaft (22) and which extend such that the distal ends of the blades are closely adjacent to the side walls (2) of the chamber (1); a plurality of blade pairs (25, 27) mounted to the rotatable shaft of a lesser extension to the pair of blades (23); and a plurality of fixed blades (24, 26, and 28) mounted to the side walls (2) of the chamber (1). All spreader bar(s) and blades are constructed of stainless steel or like corrosion-resistant material. The fixed and rotatable blades (23-28) cooperate to ensure that the waste material is reduced to particles or pieces of small dimension (typically 2 to 10 mm in length or diameter), and thoroughly mixed, thereby maximizing exposure of the putrescible and compostable waste material to the mechanical and biological processes within the chamber. The fixed and rotatable blades (23-28) also ensure that any biodegradable plastic packaging material present in the waste material is torn or shredded into particles or pieces of small dimension. To assist with the tearing or shredding of biodegradable plastic packaging, at least one of the blades or cutting edges may be provided with short spikes or teeth (FIG. 2).

Further rotatable mixing bar(s) (29) may be provided to ensure that the waste material that has passed through the fixed and rotatable blades or cutting edges (23-28) are moved by agitation.

The rotatable shaft (22) is driven by any conventional means such as a drive motor (30) equipped with a gearbox to allow clockwise and anti-clockwise rotation. Bearing housings (31, 32) are shown below the ceiling (3) of the chamber (1) and below the base (7).

At the base (7) of the chamber (1), there is provided a discharge mechanism comprising a sweeping bar or plate (33) mounted to the rotatable shaft (22) which sweeps composted product towards and out of the discharge hatch (8) for discharge to a collection bin or trolley (34) which may be positioned under the chamber (1) and between the chamber support legs (35).

The chamber is further provided with a wall mounted thermistor probe (or equivalent) (36), which is connected to an electronic control mechanism in a control box (37). This provides a temperature feedback mechanism which monitors the temperature of the composting waste material and supports automated control of compressed air supply to the chamber (1) via the air compressor (12) and associated air inlets (13). The control box (37) is preferably lockable and contains electronic componentry to control the composting process, and a safe and user friendly interface for the operator (control panel). The drive motor (30) for the sweeping bars (33), blades (23-28), spreader bar(s) (21) and mixing bar(s) (29) can be controlled by the operator at the control box (37), and/or automatically via a timer mechanism. In addition, the air compressor (12), which forces air under positive pressure into the composting waste via the air inlets (13), can also be controlled manually by the operator via the control box (37), and/or automatically via the temperature feedback mechanism described above.

The chamber operates under continuous (or plug) flow principles. In use, food waste or other putrescible organic waste is introduced into the chamber (1) through the loading hatch (9) onto an existing composting mass of previously introduced waste. The wastes may be introduced with an absorbent or absorbent material such as wood shavings or sawdust. The chamber (1) is preferably filled to a level just above the spreader bar(s) (21). The loading hatch (9) (and discharge hatch (8)) is then closed and the composting process commenced by activating the electronic control mechanism at the control box (37). Composted product may be removed from the chamber through the discharge hatch (8) to create additional space in the lower region of the chamber (1). The removal/discharge of composted product allows the composting mass to move lower into the chamber (1) under the force of gravity and mechanical agitation, creating space in the upper region of the composting chamber for the addition of more waste material. One or more distribution or spreader bar(s) (21), blades (23, 25, and 27), and mixing bar(s) which are mounted to the rotatable shaft (22) rotate in unison once the chamber is sealed and the composting process activated at the control box (37). The rotation, and direction of rotation, of the rotatable shaft (22) is operated automatically via an electronic timing mechanism so as to operate throughout the day for short periods of time. The rotation, and direction of rotation, of the rotatable shaft can be manually or automatically operated via the control box (37). In operation, the spreader bar(s) (21) mixes and spreads the recently loaded waste material evenly above the cutting blades (23-28). The blades (23-28) cooperate to form a "size reduction zone" through which all waste material must pass and which reduces the particle/piece size of the waste material, and destroys any containers or packaging present so as to expose the waste material to the mechanical and biological processes within the chamber (1). That is, the size reduction increases the surface area for microbial decomposition of the waste material, and results in more rapid composting. Further mixing and agitation of waste material occurs at various levels throughout the composting chamber (1).

Temperature is sensed by a thermistor probe (36) and monitored by the automated electronic control mechanism in the control box (37). The air compressor (12) is activated automatically in response to temperature in order to maintain a consistent temperature within the composting waste material mass of about 55° C. which is characteristic of the optimum rate of aerobic microbial decomposition. The air compressor (12) can also be operated manually by the operator (i.e., to allow for intervention, for example, where excessively wet waste material has been loaded such that there is a need for additional aeration to drive off excess moisture) via the control box (37). The controls are, however, usually and conveniently set to "auto" so that aeration can be managed automatically by the temperature feedback mechanism described above. When the thermistor probe (36) senses a change in chamber temperature to less than 50° C., the temperature feedback mechanism results in the addition into the chamber (1) of compressed air from the air compressor (12) via air inlets (13) located in the base (7) adjacent to the side walls (2) and in the lower bearing housing (32) so as to maintain optimal aerobic conditions throughout the composting mass. Since the chamber is also insulated to retain heat, the chamber is able to be operated to maintain substantially optimal aerobic and thermophilic conditions, thereby ensuring pasteurization and maximizing the rate of composting of the waste material.

The placement of one or more air inlets (13) in the lower bearing housing (32) also assists in keeping the housing (32) free of waste material.

Air which has passed through the waste material contained within the chamber (1) is forced from the top or headspace of the chamber (1) under positive pressure through the outlet (14) and ducting (15) to direct discharge to atmosphere via a vent stack, or to an odor scrubber (16) for treatment prior to discharge. A corrosion resistant fan is typically provided to assist in drawing air out of the headspace of the chamber (1) to the scrubber (16). Moisture in the process air condenses into liquid upon cooling in the ducting and is removed via the condensate discharge outlet (38), which can be plumbed directly into a sewer if required (usually only if an odor treatment unit is installed).

Composted product can be removed from the base (7) of the chamber (1) through the discharge hatch (8) to fall freely into a discharge collection bin or trolley (34). The sweeping bar(s) (33) actively discharges composted product from the discharge hatch (8).

The present invention allows the provision of a self-contained and automated waste material handling and processing system which may be used on-site (e.g., accommodation enterprises, fruit and vegetable shops and markets, retirement villages and multi-unit dwellings, supermarkets, restaurants/cafes/cafeterias, government workplaces, and hospitals). The system allows for the efficient conversion of putrescible food and organic wastes (e.g., food, meat and other high strength wastes, sawdust and wood shavings, and pre-shredded paper and cardboard packaging wastes) into a composted waste material product for garden or agricultural use.

The invention will hereinafter be further described by way of the following non-limiting example(s).

Example 1

Materials and Methods

Description of the Apparatus and Process.

A trial was conducted to objectively characterize the performance of an organic waste treatment apparatus according to FIG. 1, in terms of processing performance (i.e., retention time and processing capacity), product quality and stability, and associated environmental impacts (e.g., odor, pests and leachate).

The apparatus was designed for on-site conversion of food waste into a saleable composted waste material product, which would be capable of being operated by a single user.

The apparatus comprised a composting chamber with an internal volume of 2.4 m3. The apparatus was provided with an analogue temperature feedback mechanism (comprising a digital thermostat controller) controlled the injection of compressed air from two reciprocating air compressors via a ring main installed on the bottom outer perimeter of the composting chamber and into a bearing housing at the base of a central rotatable shaft. Injection of air occurred continuously until the composting mass reached a temperature of 50° C., at which point it was turned off, to allow composting to proceed optimally. Fixed cutting blades were fitted with short spikes to assist in the shredding and tearing of biodegradable plastic bags, so as to ensure that if any bags of this kind were introduced into the chamber, then they would be shredded or torn and thereafter evenly mixed into the composting mass. Three sickle shaped mixing bars mounted on the central rotatable shaft of the apparatus were provided to assist in mixing of the composting mass. The size reduction means and mixing system was operated at 30 rpm and was driven by a 11 kW electric motor housed beneath the chamber. Mixing of the composting mass was automatically controlled to provide mixing for approximately 60 seconds once a day.

Source separated food waste was collected in 80, 120 or 240 L wheelie bins and loaded into the composting chamber of the apparatus via a loading hatch with an integrated 150 kg lift capacity electrically-driven bin-lift unit.

Feedstock Collection and Preparation.

Combined pre- and post-consumer food waste was sourced from a commercial catering enterprise in 120 L wheelie bins that were lined with Biocorp™ biodegradable bags (corn starch polymer based). Approximately 1 ton of food waste was collected per week, and was temporarily stored in a cool room at 2° C. prior to transport and loading into the apparatus.

Wood shavings in 240 L chaff bags were used as a bulking agent to assist in the composting of the food waste to increase the carbon: nitrogen (C:N) ratio and to reduce the moisture content. The moisture content and C:N ratio of a representative 1 L sample of food waste and wood shavings was determined according to Australian Standard AS 4454 (1999). This data was used to prepare a waste mix to achieve a C:N ratio of 20:1 and a moisture content of approximately 65-68%, which is the upper maximum for rapid composting.

Operation of the Apparatus.

Approximately 210 kg wood shavings and 1000 kg food waste was loaded into the apparatus so that approximately 80% of the chamber was filled with the waste mix. All materials were weighed on a Wedderburn 100 kg platform scale prior to loading. To ensure that an appropriate composting waste material mix was obtained, one (weighed) 240 L bag of wood shavings was loaded into a 240 L wheelie bin and deposited into the apparatus via the bin lift. This was followed by approximately 100 kg food waste (approximately 1.5 120 L wheelie bins), with continuous mixing. The food waste was layered in the unit until all materials were loaded, under constant agitation via the internal mixing system to ensure that the food waste was fully incorporated into the wood shavings, and to ensure that the food waste was size reduced (particularly for hard food waste components, such as pumpkins).

The apparatus was left for one week to build up temperature before regular reloading occurred.

Based on the volume on the composting chamber, initial density of the food waste/wood shaving mix, and the volume reduction following mixing and size reduction, it was calculated that the apparatus composting vessel could process up to approximately 1230 kg of food waste per week.

A loading schedule was then developed so that a range of samples could be extracted from the vessel with different retention times. The planned loading schedule is shown in Table 1 below:

TABLE 1

Planned food waste loading schedule to determine processing performance of the apparatus and resulting product quality at a range of retention times from approximately 1 to 4 weeks.

| Week ending | Food waste loaded (kg) | Wood shaving loaded (kg) | Total material loaded (kg) | Estimated retention time (days) | Estimated retention time (weeks) |
| --- | --- | --- | --- | --- | --- |
| 1 | 1000 | 215.2 | 1215.2 | 8.6 | 1.2 |
| 2 | 700 | 150.6 | 850.6 | 12.3 | 1.8 |
| 3 | 500 | 107.6 | 607.6 | 17.2 | 2.4 |
| 4 | 300 | 64.6 | 364.6 | 28.1 | 4.0 |
| 5 | 300 | 64.6 | 364.6 | 28.1 | 4.0 |
| 6 | 300 | 64.6 | 364.6 | 28.1 | 4.0 |
| 7 | 300 | 64.6 | 364.6 | 28.1 | 4.0 |

To reduce labor requirements, food waste and wood shavings were loaded once per week with the desired weekly quantity. After the loading of each batch, the apparatus was sealed and left to process the food waste and wood shavings mixture. After each loading, plastic markers were added to the top of the composting waste material mass in the upper region of the chamber so that individual loadings could readily be identified on discharge of the composted waste material product.

An extended processing duration for the lower loading rates was performed (i.e., 300 kg/week for weeks four to seven) as it was estimated that at least 4 weeks would be required from the loading until the waste material traveled through the chamber to be available for discharge.

Samples of composted waste material product representing a retention time of approximately one, two, three and four weeks duration were extracted from the unit on weeks two, three, four and seven.

Approximately 5 L of composted waste material product was representatively sampled, bagged and stored at 0° C. prior to analysis for pH, electrical conductivity and moisture content according to Australian Standard AS 4454 (1999). A sample after one week retention time was analyzed for compliance as a pasteurized mulch according to Australian Standard AS 4454 (1999).

Apparatus Performance Analysis.

Temperature and interstitial oxygen profiles were recorded with a galvanic cell type combined oxygen/temperature probe (Demista®, USA) over the seven week trial to determine the efficiency of the aeration and temperature control system. Temperatures and interstitial oxygen profiles were taken at 300, 600 and 900 mm from the central rotatable shaft at various depths in the chamber to characterize the temperature and oxygen profiles in vertical and horizontal sections of the chamber.

The percentage of time that the air compressors were operating to maintain the thermostat set point temperature of 50° C. was determined by fitting a Dickson 5120 temperature data logger into the process air outlet. Changes in the temperature of the process air indicated when the air compressors were operational and blowing off heat from the composting waste material mass.

A number of qualitative observations were also made to characterize the performance of the apparatus during the trial, including whether air or leachate leaked through the discharge hatch; the presence or absence of leachate at the base of the apparatus; ease of loading materials into the loading hatch with the bin lift; case of discharge of compost into the discharge trolley; electrical current draw by the drive motor; efficiency of the size reduction and mixing system, and odor level emitted by the gas cleaning unit prior to discharge to the atmosphere.

Results and Discussions

Chemical and Physical Characteristics of Feedstock Materials.

The chemical and physical characteristics of food waste (including meat, dairy and seafood fractions), wood shavings and the combined food waste/wood shavings feedstock mix is shown in Table 2. As expected, the moisture content of food waste alone was very high −79.8%. This high moisture content was in part due to the fact that the food waste stream comprised post-consumer food waste, including pasta and cream/meat sauces. Due to the high moisture content and poor structure, addition of a carbonaceous bulking agent was highly preferred so as to absorb excess moisture, increase the C:N ratio, and to increase the air-filled porosity of the mix to ensure that adequate air flow and adequate composting can take place (Jackson and Line, 1998, Assessment of periodic turning as an aeration mechanism for pulp and paper mill sludge composting, Waste Management and Research, 16(4): 312-319).

TABLE 2

Chemical and physical characteristics of individual and combined feedstocks processed in the trial over an 8 week period.

| Feedstock Component | Moisture content (%, w/w) | pH | Electrical Conductivity (dS m$^{-1}$) | Organic Carbon (%, w/w) | Total Nitrogen (%, w/w) | C:N ratio | Bulk density (kg m$^3$) |
|---|---|---|---|---|---|---|---|
| Food waste | 79.8 | 5.0 | 4.45 | 54.6 | 5.20 | 10.6 | 658.5 |
| Wood shavings | 14.8 | 6.3 | 0.02 | 57.5 | 0.09 | 641.0 | 75.9 |
| Food waste and shavings | 68.9 | 5.5 | 0.92 | 56.1 | 2.80 | 20.0:1 | 430.2 |

Addition of wood shavings also slightly increased the pH of the food waste, and significantly reduced the electrical conductivity of the food waste component. The pH and electrical conductivity of the food waste/wood shavings mix were ideal for rapid composting (Miller, 1993, *Composting as a process based on the control of ecologically selective factors*, In: F. Blaine Metting Jr. (ed.), *Soil Microbial Ecology: Applications in Agricultural and Environmental Management*, Marcel Dekker Publishing, New York, pp 515-544). Wood shavings were also found to be very effective is absorbing excess moisture released by the food waste fraction, making it more amenable to composting, and also advantageously avoiding the potential for leachate formation. Leachate can be a major problem for waste management, as the leachate can be odorous, unsightly, can attract pests/vermin and has a high biological oxygen demand, making it difficult to handle.

TABLE 3

Feedstock recipes for processing food waste at different C:N ratios in the apparatus. Addition of greater quantities of food waste to achieve a C:N ratio less than 20:1 is not advisable due to the potential for leachate formation in the bottom of the composting chamber. This would increase the moisture content of the processed compost, making it difficult to store and handle.

| Food waste (kg) | Wood shavings (kg) | C:N ratio | Moisture Content (%, w/w) |
|---|---|---|---|
| 100.0 | 21.5 | 20:1 | 68.9 |
| 100.0 | 26.2 | 22:1 | 67.0 |
| 100.0 | 30.8 | 24:1 | 65.2 |
| 100.0 | 35.5 | 26:1 | 63.6 |

Size Reduction of Feedstocks, Materials Movement in the Chamber and Discharge Efficiency.

The series of cutting blades with exterior spikes was very effective in size reducing all food waste material loaded into the chamber. This included very hard components, such as avocado seeds and whole pumpkin, also biodegradable plastics bags and packaging materials.

Size reduction and mixing of incoming food waste and wood shavings was achieved rapidly within a 15 second period. The size reduction and mixing system was also very effective in thoroughly incorporating the food waste into the wood shavings. This is particularly important, as the wood shavings are required to absorb excess moisture released by the food waste during size reduction and decomposition. The composting waste mass material produced after loading and approximately seconds mixing was a very friable, moist, but not-wet mix ideal for in-vessel composting. The composting waste material mass was also observed to be sufficiently porous to permit adequate air flow during processing. Good air flow through the waste was essential to maintain high oxygen (>15% v/v) conditions for aerobic composting (Australian Standard AS 4454, 1999).

The BioCorp™ biodegradable plastic bin liners were very effectively shredded, torn and incorporated into the composting waste material mass. The spikes mounted on the rotating mixing and cutting blades were observed to be largely responsible for shredding or tearing the bags. Notably, no physical evidence of the biodegradable bags was observed, even after a very short retention time of one week.

Two column-mounted blades (mounted in the middle of the chamber) were also found to be very effective in mixing and promoting even and consistent flow of composting material through the chamber.

The composted product was found to be easily extracted from the apparatus, being achieved through the sweeping action of a sickle blade mounted close to the bottom of the composting chamber. Compost was swept out of the chamber relatively evenly and into a discharge trolley. Approximately three rotations of the central shaft was required, occurring in approximately five seconds, to extract a 50 L vessel of composted waste product. Although the discharge was very efficient, it is recommended that two vessels be fitted on the trolley to enable quicker extraction of compost by a single operator.

Food Waste Processed Over the Trial.

Actual quantities of food waste and wood shavings processed during the seven week trial is shown in Table 4. It should be noted that weekly quantities of food waste were loaded at a maximum frequency of twice per week as it was not possible to do this on a daily basis within the context of the trial.

Based on the ratios of food waste to wood shavings, it was calculated that the chamber capacity of the apparatus was found to be suitable for processing approximately 1230 kg of food waste per week. By changing the loading rate per week, the effect on the length of time waste material was retained and processed in the apparatus could be determined (Table 4).

mophilic temperature and highly aerobic conditions (high oxygen, >15% v/v) within the composting chamber. The pre-set temperature of 50° C. was chosen to ensure rapid breakdown of the food waste, though at this temperature, the length of time required for pasteurization (i.e., microbial pathogen and weed seed destruction) was extended compared to higher temperatures around 55° C. (Miller, 1993, supra). Changes in temperature (at probe) and interstitial oxygen concentration (average of three samples taken in cross section in centre of composting chamber) over the 7 week composting trial are shown in FIG. 3.

Figure 4:
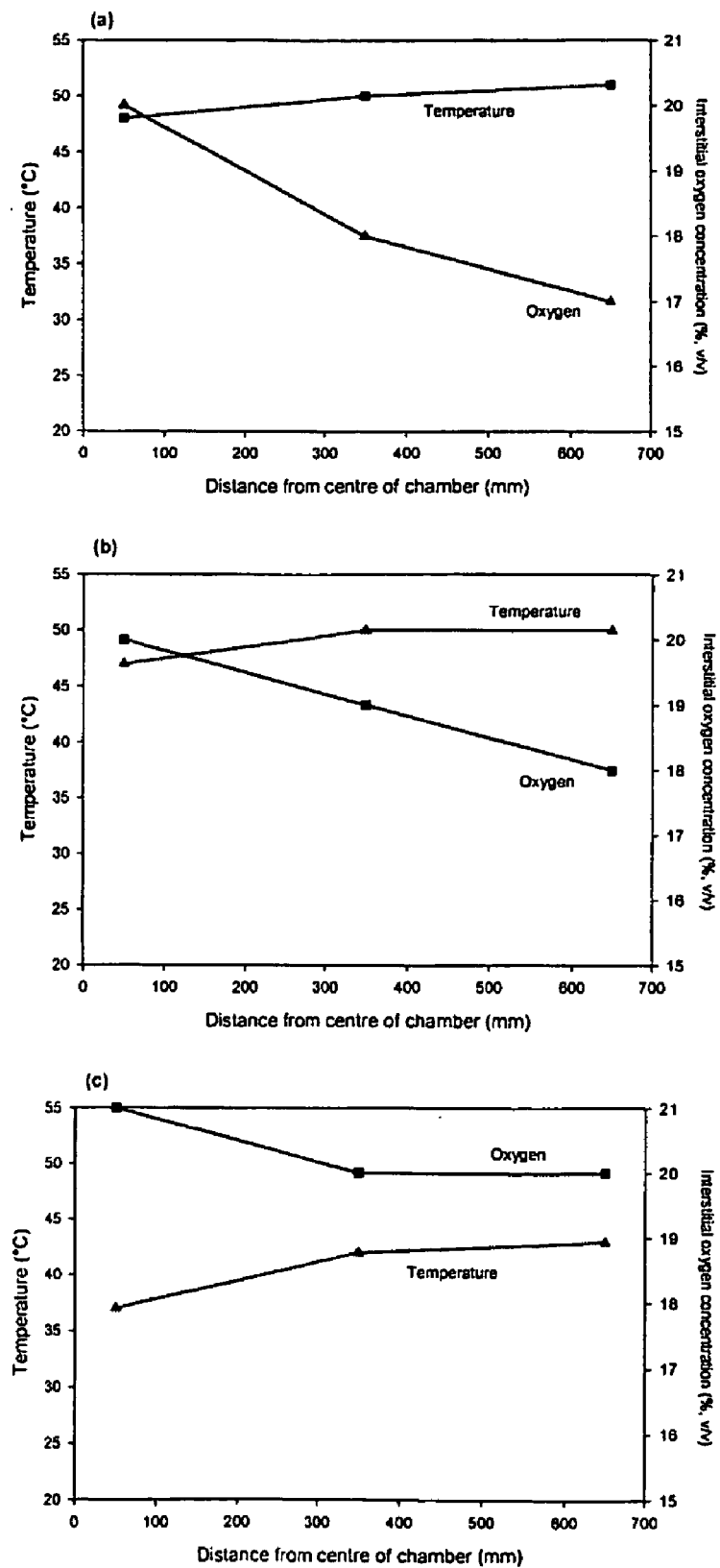

During the first three days of processing, temperatures throughout the apparatus rapidly rose to the set-point due to increasing microbial activity, due to abundant carbon, nitrogen and oxygen present. A rapid rise in temperature is characteristic of well managed composting systems (Miller, 1993, supra). The insulation installed in the side walls of the composting chamber was effective in preventing excessive heat loss. The temperature profiles in the top, middle and bottom of the apparatus are shown in FIG. 4.

In general, the zone immediately in the vicinity of the central rotatable shaft was on most occasions approximately 3° C. cooler than the edge of the composting chamber (FIG. 4a), because 50% of the air injected into the composting chamber occurred via the bearing housing at the base of the chamber.

Distribution of oxygen in the apparatus was excellent. Due to the higher air flow rates around the central rotatable shaft, good oxygenation of this zone occurred, with oxygen contents mostly above 20% during the trial. Oxygenation of the outer zone of the composting vessel was also considered good, with oxygen concentrations ranging from 20% near the bottom (FIG. 4c) to 17% near the top surface of the composting waste material mass (FIG. 4a). Better oxygenation of the outer zone of the composting chamber was expected near the base, due to closer proximity to the air injectors installed near the bottom of side wall(s). Evidence suggests that highly aerobic conditions were maintained in the composting chamber, thus preventing the possibility of mal formation, which can occur when the oxygen concentration drops to below 15% (Australian Standard AS 4454, 1999). The absence of mal

TABLE 4

Food waste processed by the apparatus during the trial phase. Note that varying quantities of food waste were added to produce product of various retention times of 1 to 4 weeks to permit an evaluation of the ideal retention time to achieve a given product quality.

| Week ending | Planned food waste loading (kg) | Actual food waste loaded (kg) | Actual wood shavings loaded (kg) | Total material loaded (kg) | Approximate retention time of loading in unit (days) | Approximate retention time (weeks) |
|---|---|---|---|---|---|---|
| 1 | 1000 | 979 | 259 | 1.238 | 8.8 | 1.3 |
| 2 | 700 | 751 | 158 | 909 | 11.5 | 1.6 |
| 3 | 500 | 482 | 103 | 585 | 17.9 | 2.6 |
| 4 | 300 | 303 | 61 | 364 | 28.5 | 4.0 |
| 5 | 300 | 300 | 61 | 361 | 28.1 | 4.0 |
| 6 | 300 | 300 | 61 | 361 | 28.1 | 4.0 |
| 7 | 300 | 300 | 61 | 361 | 28.1 | 4.0 |

Weekly batches of the composted product were readily identified following discharge by the presence of plastic markers of different types. Materials were relatively evenly discharged, though the markers were difficult to identify upon discharge from the chamber.

Temperature and Oxygen Profiles in the Unit.

Results indicated that the temperature feedback mechanism was effective in maintaining a relatively constant thermophilic temperature during processing was noted in observations of untreated process air discharged direct to atmosphere.

Maintenance of uniform thermophilic temperatures (>45° C.) was achieved throughout most of the apparatus, except in approximately the bottom 20%. This is because this zone is in direct contact with the air injectors installed in the side wall and in the bearing housing at the base. Thus, materials in the upper 80% of the composting chamber should be pasteurized before movement into the bottom 20% of the chamber, where slightly cooler temperatures are maintained due to immediate contact with injection air. This is to ensure a sanitized composted product is discharged from the base of the apparatus.

To achieve higher temperatures in the composting chamber, the thermostat set-point could be raised to approximately 55° C., which would result in an overall increase in approximately 5° C. in the entire composting chamber, thus reducing the time required for pasteurization.

Retention Time, Product Quality and Maximum Processing Capacity.

A number of samples of the composted product were discharged over the course of the trial to determine quality and level of decomposition, and corresponding retention times. The cost/benefit equation is affected by how much food waste is recycled per unit time, and therefore determination of maximum processing capacity to generate a product of minimal acceptable quality had to be determined.

Product discharged after a one week retention time contained no visible food material and had started to turn brown in color, indicating that the product had been rapidly decomposing. The product discharged was moist, though no free water was released during the squeeze test (Australian Standard AS4454, 1999). A fruit/vegetable odor could be detected from product. The product was also very fine and well textured, having appropriate particle size characteristics to be used as a mulch.

Product discharged after 2 and 3 weeks visually appeared to be more humified and decomposed compared to product processed for one week and had less fruit/vegetable odor. Product after four weeks visually appeared to be quite humified, and some earthy odor could be detected from the product, indicating the composting process was nearing completion.

Product testing after one week indicated that the product met most of the requirements of a pasteurized mulch according to the Australian Standard AS 4454 (1999). Additional curing in a pile or in perforated containers may be desirable for the composted product to a higher level of stability and pass the requirements as a fully composted mulch product.

Air Quality.

Treatment of the discharge air by an activated carbon gas cleaner reduced the detectable levels of volatile organic carbon compounds in the air, which contribute to odor formation. Whilst the air discharged by the gas cleaning unit was not odorless, the slight odors present were similar to cooked food, which were found to dissipate rapidly in the surrounding atmosphere to undetectable levels. At no time were odors—offensive, which typically occurs under anaerobic conditions (e.g., hydrogen sulfide and volatile fatty acids).

Also, at no time was malodorous air discharged by the gas cleaning unit into the surrounding atmosphere, and as a result, no pests or insects were seen to be attracted to the apparatus.

Condensate collected below the activated carbon filtration chamber, however, needed to be tapped off and either collected in a plastic vessel or discharged direct to sewer. Alternatively, this condensate could be recycled in the apparatus by adding it with an appropriate amount of wood shavings so as to avoid leachate formation.

CONCLUSION

The performance evaluation of the apparatus revealed that the technology could process efficiently up to 1200 kg of food waste per week based on a retention time of one week. Size reduction, mixing and aeration systems performed efficiently to allow the controlled decomposition of food waste with wood shavings into a composted waste material product. Product discharged after a one week retention time was partly mature and passed most of the requirements of a pasteurized mulch as defined in AS 4454 (1999).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An apparatus for aerobically composting waste material in an aerated composting process, the apparatus comprising:
   an enclosed vessel comprising a first end wall, a second, opposing end wall and side wall(s) defining an interior vessel space;
   a rotatable shaft located within said vessel space;
   a drive means operatively connected to said rotatable shaft for driving said shaft:
   size reduction means for reducing the size of waste material introduced to the vessel; wherein said size reduction means divides the interior vessel space into first and second regions and defines a zone of size reduction through which waste material must pass as it passes through the vessel;
   said size reduction means comprising one or more cantilevered bars, blades or cutting plates rigidly mounted on said rotatable shaft and rotatable with said shaft, and one or more fixed bars, blades or cutting plates mounted on and extending from said side wall(s), wherein said rotatable and fixed bars, blades or cutting plates overlap and co-operate together to create a shearing action so as to reduce the size of the waste material as said waste material passes through said size reduction means;
   a loading port through which waste material may be introduced to said first region of the vessel;
   a discharge port through which waste material may be removed from the second region of the vessel; and
   a source of oxygen for maintaining conditions within said vessel suitable for the aerobic composting of said waste material;
   wherein, when the apparatus is in use, waste material introduced to said vessel moves from said first region through the size reduction means to said second region.

2. An apparatus for aerobically composting waste material as claimed in claim 1 wherein said vessel is constructed of, or lined with, stainless steel or alternative corrosion-resistant material.

3. An apparatus for aerobically composting waste material as claimed in claim 1 wherein said side wall(s) and/or said end walls are insulated so as to retain heat generated by aerobic composting of introduced waste material.

4. An apparatus for aerobically composting waste material as claimed in claim 1 wherein said internal vessel space is of an internal volume of less than 8 m$^3$.

5. An apparatus for aerobically composting waste material as claimed in claim 4 wherein said internal volume of said internal vessel space is within the range of 1.5 m$^3$ to 5.0 m$^3$.

6. An apparatus for aerobically composting waste material as claimed in claim 5 wherein said internal volume of said internal vessel space is within the range of 2.0 m$^3$ to 3.0 m$^3$.

7. An apparatus for aerobically composting waste material as claimed in claim 1, wherein at least one of the rotatable bars, blades or cutting plates rotates for a portion of its rotation directly past and adjacent to said fixed bars, blades or cutting plates.

8. An apparatus for aerobically composting waste material as claimed in claim 7, wherein at least one of the rotatable bars, blades or cutting plates rotates for a portion of its rotation within a parallel space between two of said fixed bars, blades or cutting plates.

9. An apparatus for aerobically composting waste material as claimed in claim 7 wherein one or more of said fixed and moving bars, blades or cutting plates include a plurality of teeth.

10. An apparatus for aerobically composting waste material as claimed in claim 8 wherein said parallel space between said two of said fixed bars, blades or cutting plates is less than 200 mm in width.

11. An apparatus for aerobically composting waste material as claimed in claim 10 wherein said parallel space between said two of said fixed bars, blades or cutting plates is less than 100 mm in width.

12. An apparatus for aerobically composting waste material as claimed in claim 8 wherein said rotatable and fixed bars, blades or cutting plates are of substantially similar widths.

13. An apparatus for aerobically composting waste material as claimed in claim 8 wherein said width of the rotatable and fixed bars or blades is within the range of 30 to 200 mm.

14. An apparatus for aerobically composting waste material as claimed in claim 1 wherein said loading port is located in the side wall(s) adjacent to the upper end wall.

15. An apparatus for aerobically composting waste material as claimed in claim 1 wherein said loading port is located in the upper end wall.

16. An apparatus for aerobically composting waste material as claimed in claim 1 wherein said discharge port is located in the side wall(s) adjacent to the lower end wall.

17. An apparatus for aerobically composting waste material as claimed in claim 1 wherein said discharge port is located in the lower end wall.

18. An apparatus for aerobically composting waste material as claimed in claim 1 wherein one end of said rotatable shaft is mounted on or near one end wall, and the opposing end of said rotatable shaft is mounted on or near the opposing end wall.

19. An apparatus for aerobically composting waste material as claimed in claim 1 wherein said rotatable shaft is located centrally within the vessel.

20. An apparatus for aerobically composting waste material as claimed in claim 1 wherein said rotatable shaft rotates at a speed of less than 60 rpm.

21. An apparatus for aerobically composting waste material as claimed in claim 20 wherein said rotatable shaft rotates at a speed in the range of 10 to 30 rpm.

22. An apparatus for aerobically composting waste material as claimed in claim 1 wherein said drive means comprises a single motor.

23. An apparatus for aerobically composting waste material as claimed in claim 1 wherein one or more agitation bar(s) are mounted on said rotatable shaft for promoting even and consistent flow of materials through the vessel.

24. An apparatus for aerobically composting waste material as claimed in claim 1 wherein one or more distribution bars are mounted on said rotatable shaft in the region of the loading port for assisting in loading materials into the vessel and feeding said waste material into said zone of size reduction.

25. An apparatus for aerobically composting waste material as claimed in claim 1 wherein one or more sweeper bars or discharge plates are mounted on said rotatable shaft to promote composted material towards and out of the discharge port.

26. An apparatus for aerobically composting waste material as claimed in claim 1 wherein free ends of said one or more rotatable bars, blades or cutting plates are shaped so as to draw material away from said side wall(s) of the vessel.

27. An apparatus for aerobically composting waste material as claimed in claim 1 wherein said rotatable shaft is capable of rotation both in a clockwise and anti-clockwise direction, and one or more rotating bars, blades or cutting plates, agitation bars or discharge sweeper bar/plate(s) are shaped symmetrically or otherwise asymmetrically shaped so as to draw material away from said side wall(s) of the vessel whilst rotating in either direction to allow for effective action in both directions.

28. An apparatus for aerobically composting waste material as claimed in claim 1 wherein said discharge port can be closed with a hatch or cover to form a watertight and airtight seal.

29. An apparatus for aerobically composting waste material as claimed in claim 1 wherein said loading port can be closed with a hatch or cover to form a watertight and airtight seal.

30. An apparatus for aerobically composting waste material as claimed in claim 1 wherein said source of oxygen is controlled so as to provide sufficient oxygen to maintain the temperature and oxygen conditions within the vessel space for composting by aerobic mesophilic and thermophilic microorganisms.

31. An apparatus for aerobically composting waste material as claimed in claim 1 further comprising one or more temperature sensor(s) within the vessel for monitoring temperature and controlling the supply of oxygen to the vessel space.

32. An apparatus for aerobically composting waste material as claimed in claim 1 wherein said source of oxygen is in the form of compressed air.

33. An apparatus for aerobically composting waste material as claimed in claim 32 wherein if the temperature, as measured by temperature sensor, drops to below a first set temperature, said source of oxygen is activated in a manner that supports increased biological activity and consequently causes an increase in temperature; and if the temperature, as measured by temperature sensor, increases to above a second set temperature said source of oxygen is activated to blow off excess heat, thereby maintaining temperatures within the desired range.

34. An apparatus for aerobically composting waste material as claimed in claim 33 wherein said temperature sensor is located in the lower region of the vessel in a position within 250-450 mm of the lower end wall.

35. An apparatus for aerobically composting waste material as claimed in claim 1 wherein supplied oxygen enters the vessel by one or more inlets located in the side wall(s) relatively adjacent to the join with the lower end wall.

36. An apparatus for aerobically composting waste material as claimed in claim 1 wherein supplied oxygen enters the vessel by one or more inlets located in the lower end wall and/or located centrally in a basal bearing of the said rotatable shaft.

37. An apparatus for aerobically composting waste material as claimed in claim 1 wherein the apparatus is provided with at least one process air outlet located in or adjacent to the top of the vessel, to discharge gas or process air from within the vessel.

38. An apparatus for aerobically composting waste material as claimed in claim 1 wherein discharge gas or process air from within the vessel is fed to a biofiltration or odour treatment unit to treat said air prior to release to atmosphere.

39. An apparatus for aerobically composting waste material as claimed in claim 1 wherein said fixed bars, blades or cutting plates have first and second ends and are mounted to said side wall(s) at both said first and second ends so as to extend across said interior vessel space.

40. The apparatus of claim 1, wherein the rotatable shaft is mounted to the first end wall and to the second end wall.

* * * * *